Oct. 24, 1939. W. J. WILKINSON 2,177,195
COLOR CORRECTION OF NEGATIVES AND PRINTING-PLATES
Filed Feb. 8, 1939
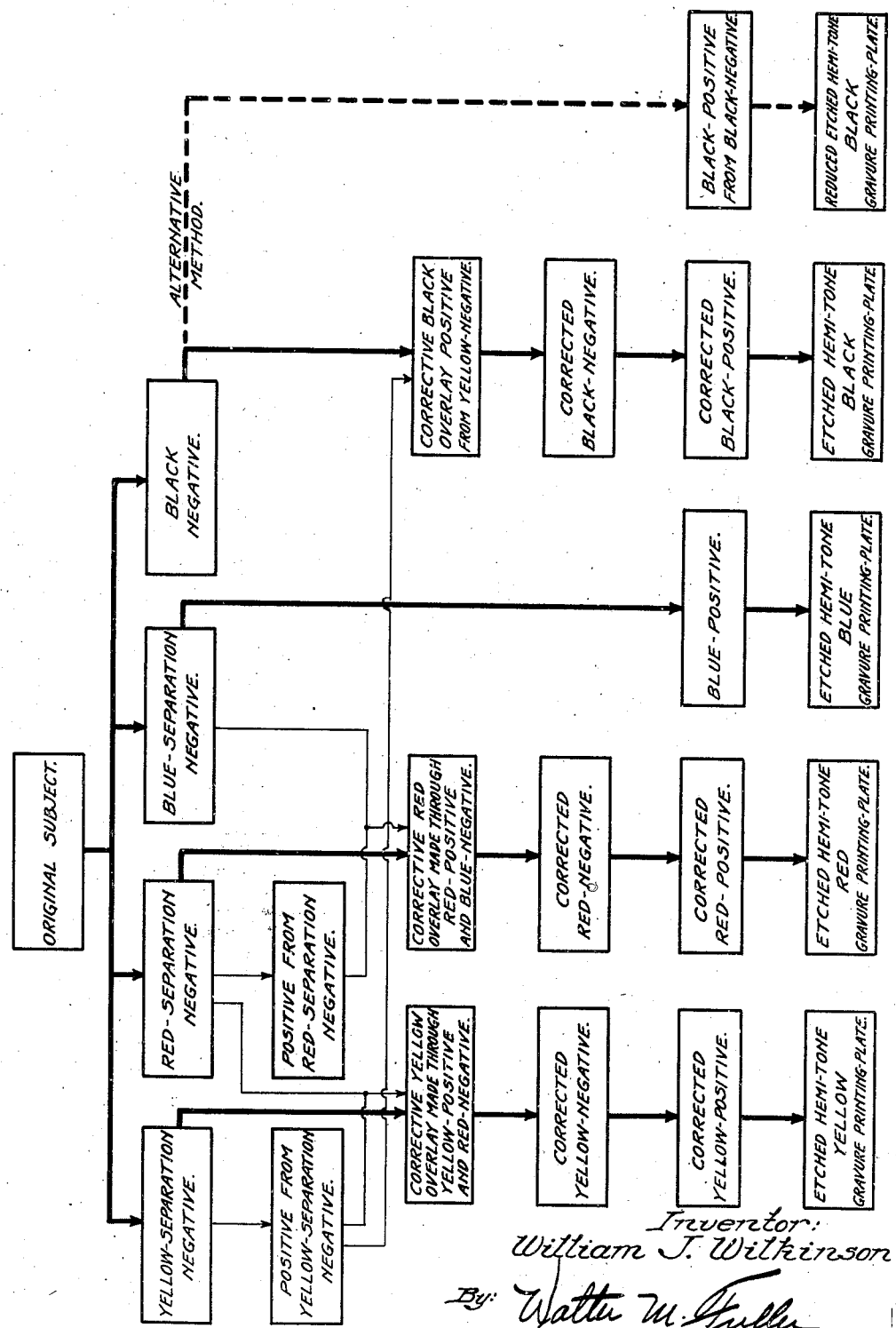

Patented Oct. 24, 1939

2,177,195

UNITED STATES PATENT OFFICE 2,177,195

COLOR CORRECTION OF NEGATIVES AND PRINTING PLATES

William J. Wilkinson, Eastchester, N. Y., assignor of one-half to Miehle Printing Press and Manufacturing Company, Chicago, Ill., a corporation of Illinois Application February 8, 1939, Serial No. 255,221

7 Claims. (Cl. 95—5.1)

The current invention, presented diagrammatically in the single view of the associated drawing forming a part of this specification, relates to the modification or correction of photographic, color-separation negatives and of the corresponding printing-plates of an original multicolored subject, whereby the final print made from the printing-plates produced from such negatives will accurately represent the original subject in all its colors, the present invention constituting an improvement over that presented in my United States Patent 2,099,916, Color-corrected printing, granted November 23, 1937.

According to the invention of such patent, the color-separation negatives, made through the usual filters, were improved by the employment of certain overlay transparencies associated therewith, the overlay for the yellow-separation negative comprising a photographic-transparency made through a combination of (a) a positive-transparency made from the yellow-separation negative and (b) the blue-separation negative; the overlay for the red-separation negative consisting of a photographic positive-transparency produced from the blue-separation negative; and the overlay for the blue-separation negative comprising a transparency made through a combination of (a) a positive-transparency made from the blue-separation negative and (b) the yellow-separation negative.

In practicing such patented procedure, in some instances, trouble was encountered with the violets, and the present invention involves a substantial improvement over such earlier method in that it effects the elimination of the undesired violets without excessive interference with the oranges.

Accordingly, the instant invention includes the production of the corrective overlay for the yellow-separation negative by making a photographic positive-transparency from the yellow-separation negative and then making the photographic overlaying-transparency through such positive-transparency and the red-separation negative while the two are superposed and in register with one another.

The red-separation negative, as in the previous instance, is corrected by a transparency-overlay made through the superposed registered blue-separation negative and a positive from the red-separation negative; and, ordinarily, the blue-separation negative requires no alternative overlay.

In case a black negative is used, which, of course, is not always necessary, it may be modified or corrected by employing as a rectifying overlay therefor a photographic-positive transparency made through the yellow-separation negative, or, a normal black exposure of the subject may be made to produce a negative without the use of a filter, and from this, when practicing the hemi-tone gravure method, as set forth in such Patent 2,099,916, from such negative a normal hemi-tone positive-transparency is made depicting the blacks by dots in checkerboard-design, but when etching the printing-plate its period of action is only about one-fifth the etching time for the other printing-plates.

Those negatives requiring correction or improvement having been supplied with the proper overlays as described above, photographic-positive transparencies are made for all of the negatives, and, from these color-separation positives, in the manner disclosed in such patent, etched, hemi-tone, color, gravure printing-plates are made, the printing therefrom being done either in three or four colors, as the circumstances dictate.

The foregoing, coupled with the disclosure in said United States Patent 2,099,916 is sufficient for the practice of the new procedure, but it is to be understood that the latter is not necessarily restricted and confined to the exact details set forth, the scope of the invention being defined in the appended claims which should be construed as generically as the condition of the prior art permits with maintenance of their validity.

The foregoing procedure is not limited to the production of screened hemi-tone positive-transparencies and their correlative printing-plates, the novel color correction method being suitable for use in other relations.

I claim:

1. The process of making:

(a) Yellow, red and blue color-separation photographic-negatives of a multi-color subject, (b) A positive photographic-transparency through said yellow-separation negative, (c) A corrective photographic overlay-transparency for said yellow-separation negative comprising making a photographic-transparency through said positive-transparency and said red-separation negative while the two are in superposed registered relation, (d) Correction of said yellow-separation negative by applying said overlay thereto and in register therewith, (e) A second positive photographic-transparency through said red-separation negative, (f) A corrective photographic overlay-transparency for said red-separation negative through said second positive-transparency and said blue-separation negative while the two are in superposed registered relation, (g) Correction of said red-separation negative by applying its said corrective overlay thereto and in register therewith, and (h) Corresponding printing-plates from said corrected yellow-separation and red-separation negatives and said blue-separation negative.

2. The process of making:

(a) Yellow, red and blue color-separation photographic-negatives of a multi-color subject, (b) A positive photographic - transparency through said yellow-separation negative, (c) A corrective photographic overlay-transparency for said yellow-separation negative comprising making a photographic-transparency through said positive-transparency and said red-separation negative while the two are in superposed registered relation, (d) Correction of said yellow-separation negative by applying said overlay thereto and in register therewith, (e) A second positive photographic-transparency through said red-separation negative, (f) A corrective photographic overlay-transparency for said red-separation negative through said second positive-transparency and said blue-separation negative while the two are in superposed registered relation, (g) Correction of said red-separation negative by applying its said corrective overlay thereto and in register therewith, (h) A photographic positive - transparency through each of said corrected yellow-separation and red-separation negatives and said blue-separation negative, and (i) An etched hemi-tone gravure printing-plate from each of said last-mentioned positive-transparencies.

3. The process of making:

(a) Yellow-separation, red-separation, blue-separation and black photographic-negatives of a multi-color subject, (b) A positive photographic - transparency through said yellow-separation negative, (c) A corrective photographic overlay-transparency for said yellow-separation negative comprising making a photographic-transparency through said positive-transparency and said red-separation negative while the two are in superposed registered relation, (d) Correction of said yellow-separation negative by applying said overlay thereto and in register therewith, (e) A second positive photographic-transparency through said red-separation negative, (f) A corrective photographic overlay-transparency for said red-separation negative through said second positive-transparency and said blue-separation negative while the two are in superposed registered relation, (g) Correction of said red-separation negative by applying its said corrective overlay thereto and in register therewith, and (h) Corresponding printing-plates from said corrected yellow-separation and red-separation negatives and said blue-separation and black negatives.

4. The process of making:

(a) Yellow-separation, red-separation, blue-separation and black photographic-negatives of a multi-color subject, (b) A positive photographic - transparency through said yellow-separation negative, (c) A corrective photographic overlay-transparency for said yellow-separation negative comprising making a photographic-transparency through said positive-transparency and said red-separation negative while the two are in superposed registered relation, (d) Correction of said yellow-separation negative by applying said overlay thereto and in register therewith, (e) A second positive photographic-transparency through said red-separation negative, (f) A corrective photographic overlay-transparency for said red-separation negative through said second positive-transparency and said blue-separation negative while the two are in superposed registered relation, (g) Correction of said red-separation negative by applying its said corrective overlay thereto and in register therewith, (h) A photographic positive - transparency through each of said corrected yellow-separation and red-separation negatives and said blue-separation and black negatives, and (i) An etched hemi-tone gravure printing-plate from each of said last-mentioned positive-transparencies.

5. The process of making:

(a) Yellow-separation, red-separation, blue-separation and black photographic-negatives of a multi-color subject, (b) A positive photographic - transparency through said yellow-separation negative, (c) A corrective photographic overlay-transparency for said yellow-separation negative comprising making a photographic-transparency through said positive-transparency and said red-separation negative while the two are in superposed registered relation, (d) Correction of said yellow-separation negative by applying said overlay thereto and in register therewith, (e) A second positive photographic-transparency through said red-separation negative, (f) A corrective photographic overlay-transparency for said red-separation negative through said second positive-transparency and said blue-separation negative while the two are in superposed registered relation, (g) Correction of said red-separation negative by applying its said corrective-overlay thereto and in register therewith, and (h) Correction of said black negative by applying said positive from the yellow-separation negative thereto and in register therewith, and (i) Corresponding printing-plates from said corrected yellow-separation, red-separation, and black negatives and said blue-separation negative.

6. The process of making:

(a) Yellow-separation, red-separation, blue-separation and black photographic-negatives of a multi-color subject, (b) A positive photographic - transparency through said yellow-separation negative, (c) A corrective photographic overlay-transparency for said yellow-separation negative comprising making a photographic-transparency through said positive-transparency and said red-separation negative while the two are in superposed registered relation, (d) Correction of said yellow-separation negative by applying said overlay thereto and in register therewith, (e) A second positive photographic-transparency through said red-separation negative, (f) A corrective photographic overlay-transparency for said red-separation negative through said second positive-transparency and said blue-separation negative while the two are in superposed registered relation, (g) Correction of said red-separation negative by applying its said corrective overlay thereto and in register therewith, (h) Correction of said black-negative by applying said positive-transparency made from said yellow-separation negative thereto and in register therewith, (i) A positive-transparency through each of said corrected yellow-separation, red-separation and black negatives and said blue-separation negative, and (j) An etched hemi-tone gravure printing-plate from each of said last-mentioned positive-transparencies.

7. The process of making:

(a) Yellow-separation, red-separation, blue-separation and black photographic-negatives of a multi-color subject, (b) A positive photographic - transparency through said yellow-separation negative, (c) A corrective photographic overlay-transparency for said yellow-separation negative comprising making a photographic-transparency through said positive-transparency and said red-separation negative while the two are in superposed registered relation, (d) Correction of said yellow-separation negative by applying said overlay thereto and in register therewith, (e) A second positive photographic-transparency through said red-separation negative, (f) A corrective photographic overlay-transparency for said red-separation negative through said second positive-transparency and said blue-separation negative while the two are in superposed registered relation, (g) Correction of said red-separation negative by applying its said corrective overlay thereto and in register therewith, (h) A positive-transparency through each of said corrected yellow-separation and red-separation negatives and said blue-separation and black negatives, and (i) An etched hemi-tone gravure printing-plate from each of said last-mentioned positive-transparencies, the depth of etching of said black printing-plate being a small fraction of that of the other printing-plates.

WILLIAM J. WILKINSON.